May 8, 1973 G. J. LE BRASSE ET AL 3,732,083
COMPOSITE ARTICLE
Filed Aug. 13, 1970
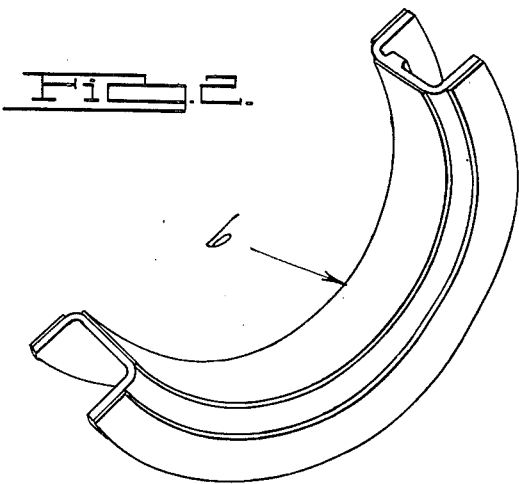
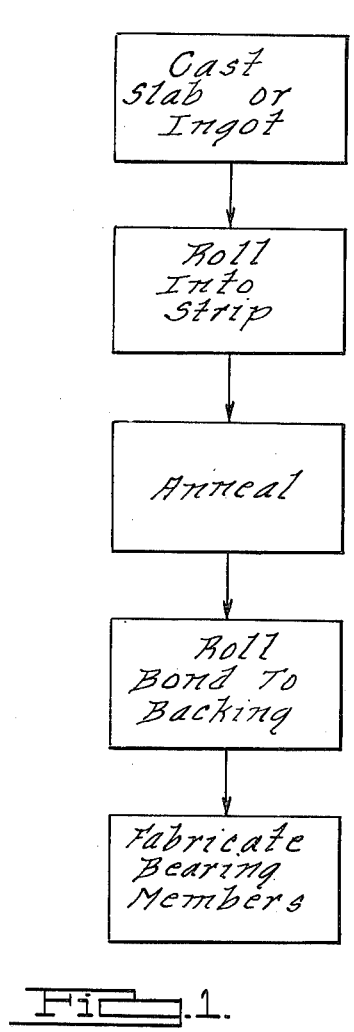
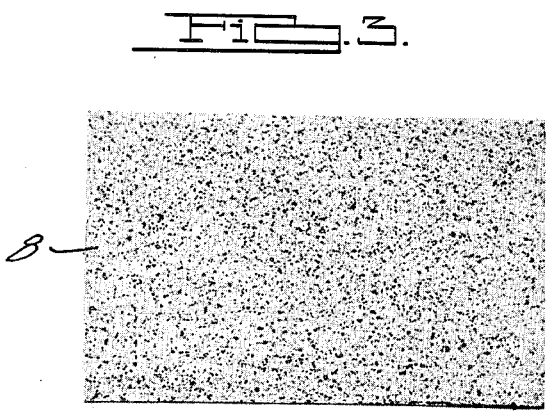
INVENTORS.
Gordon J. LeBrasse
Victor Gallatin
BY
Barnes, Dickey & Pierce
ATTORNEYS __United States Patent Office__

3,732,083
Patented May 8, 1973

3,732,083
COMPOSITE ARTICLE
Gordon J. Le Brasse and Victor Gallatin, Ann Arbor,
Mich., assignors to Federal-Mogul Corporation
Filed Aug. 13, 1970, Ser. No. 63,419
Int. Cl. B32b 15/20
U.S. Cl. 29—197                                5 Claims

ABSTRACT OF THE DISCLOSURE

An aluminum based bearing alloy and bearing components fabricated therefrom which comprises from about 3.5% to about 4.5% tin, from about 3.5% to about 4.5% silicon, from about 0.7% to about 1.3% copper and the balance substantially all aluminum, along with conventional impurities.

BACKGROUND OF THE INVENTION

Various aluminum-based alloys have heretofore been used or proposed for use as bearing materials in view of their good fatigue life, high load carrying capacity and corrosion resistance. Such aluminum bearing alloys have been formed for fabricating bearing components which are either entirely comprised of the alloy or, alternatively and more frequently, are of a composite construction in which the aluminum-based bearing alloy is supported by a high-strength backing member such as steel, for example. In this latter instance, the aluminum-based bearing alloy is conventionally disposed in the form of a thin, continuous lining which is tenaciously bonded to the metal backing member. Typical of such composite bearing components are shell-type half bearings of the types employed in automobile internal combustion engines and the like.

Various problems and difficulties have been encountered in the fabrication of bearing components employing aluminum-based bearing alloys of the types heretofore known. As an example, some aluminum based bearing alloys employed for forming a composite bi-metal strip consisting of a steel backing strip to which the aluminum bearing alloy is bonded has necessitated relatively extensive preparation of the adjoining faces to achieve a bond of the requisite strength. Such surface preparations, aside from pre-cleaning, have included the deposition of one of a variety of electroplatings or clad layers, including nickel, silver, pure aluminum, copper cobalt, etc., on the surfaces to be bonded, providing an interlayer which enhances bond strength. The necessity of undergoing such additional processing steps, as well as the necessity of exercising extreme caution to assure maintenance of proper conditions during the formation of such composite bi-metal strips has detracted from the efficiency and economy of manufacturing such aluminum based bearing alloy components. Aluminum based bearing alloy compositions of the types heretofore known have also, in many instances, been defective in providing optimum antifriction properties over a broad range of operating conditions, necessitating a restricted application of specific compositions to specific end uses. The absence of flexibility and versatility in use of such bearing alloys have also detracted somewhat from a more widespread use thereof.

The foregoing problems and disadvantages are overcome by the novel aluminum based bearing alloy of the present invention which can readily be fabricated into bearing components employing simple, well known techniques and wherein such components can be used over a wide range of operating conditions, enhancing the flexibility and versatility thereof and the useful operating life of the apparatuses in which they are installed.

SUMMARY OF THE INVENTION

The benefits and advantages of the present invention are achieved by an aluminum based bearing alloy of a controlled composition which contains from about 3.5% to about 4.5% tin, from about 3.5% to about 4.5% silicon, from about 0.7% to about 1.3% copper, with the balance essentially all aluminum, including conventional impurities in amounts which do not appreciably affect the physical and chemical properties of the resultant bearing alloy. The bearing alloy is conventionally employed in the form of a relatively thin lining bonded to a high-strength backing member which usually consists of a low carbon or low alloy steel. The composition strip consisting of the aluminum based bearing alloy bonded to the steel backing strip can conveniently be fabricated by superimposing a strip of the bearing alloy on the steel backing strip in overlying relationship, and thereafter rolling them in a manner so as to effect a solid phase welding of the strips at the interface. It is also contemplated within the scope of the invention that composite bearing strips employing the improved bearing alloy as a lining thereon can be formed into a variety of bearing components including thrust washers, shell-type half bearing, bushings, flanged sleeve bearings, and the like.

Additional benefits and advantages of the present invention will become apparent upon a reading of the description of the preferred embodiments, taken in conjunction with the accompanying drawing.

BRIEF DESCRIPTION OF THE DRAWING

FIG. 1 is a diagrammatic flow chart illustrating the basic steps in forming a composite-type bearing component;

FIG. 2 is a perspective view of a flanged type half bearing typical of the various bearing components that can be fabricated from a composite bearing material of the present invention; and FIG. 3 is a photomicrograph taken at a magnification of 200 times through a composite bearing strip incorporating a bearing lining in accordance with the preferred practice of the present invention.

DESCRIPTION OF THE PREFERRED EMBODIMENTS

The composition of the aluminum based bearing alloy, as herein described and claimed, is expressed in terms of percentages by weight, unless otherwise specified.

In order to achieve the benefits of the present invention, the aluminum based bearing alloy composition contains, as the essential alloying elements, from about 3.5% to about 4.5% tin, from about 3.5% to about 4.5% silicon, from about 0.7% to about 1.3% copper, with the balance substantially all aluminum. In addition to the foregoing constituents, the bearing alloy may contain the conventional impurities present in the conventional amounts which do not appreciably affect the physical and chemical properties of the alloy composition. To this end, iron may be present in an amount up to about 0.5% maximum, titanium may be present in an amount up to about 0.2%, maximum, manganese may be present in an amount up to about 0.2% maximum, magnesium may be present in an amount up to about 0.2% maximum; while other impurities, such as boron, cadmium, zinc, lead and the like, may be present in individual amounts of up to 0.05% maximum and where the total amount of such impurities preferably is less than 0.15% maximum.

The bearing alloy composition is controlled within the aforementioned composition range since amounts of tin below about 3.5% have been found to result in increased wear and decreased frictional propertions; whereas amounts of tin in excess of about 4.5% interferes with the fabrication of the bearing alloy into bearing components due to the inferior workability and lower ductility of the bearing alloy strip. In addition, such higher tin contents also provent hot roll bonding of the bearing alloy to high-strength backing strips due to the exudation of tin and further results in the attainment of inferior bond strength of such composite strips. Amounts of tin in excess of about 4.5% also result in an undesirable tin sweat during the annealing of the alloy, requiring relatively tedious practices to effect a removal thereof. The amount of silicon in the bearing alloy is carefully controlled within the aforementioned limits since amounts less than about 3.5% contribute toward increased friction of the bearing components fabricated therefrom and also result in excessive wear. On the other hand, quantities of silicon in excess of about 4.5% produce an impairment in the machinability of the bearing alloy lining, particularly by broaching as required in the fabrication of precision-type shell bearings. The copper constituent of the aluminum base alloy should be at least about 0.7% since amounts less than that quantity result in insufficient hardness and an insufficient response of the alloy to hardness increases as a result of cold working. On the other hand, amounts of copper greater than about 1.3% produce excessive hardness, as well as detrimental age hardening characteristics of the alloy, resulting in an undesirable degree of shaft wear. As previously indicated, iron can be tolerated in amounts up to about 0.5% without any adverse effects on the antifriction properties of the alloy. However, when the quantity of iron exceeds the maximum limits of about 0.5%, the formation of undesirable hard spots in the bearing lining has been observed in some instances, which contribute toward excessive shaft wear. The remaining enumerated impurities of the types conventionally found associated with the main alloying constituents, as previously indicated, are preferably controlled so as to be present in amount less than 0.15%, in which quantities they have been found to have no appreciable effect upon the advantageous characteristics of the alloy composition. In accordance with the preferred practice of the present invention, the alloy is preferably controlled so as to nominally contain about 4% tin, about 4% silicon, about 1% copper, and with the balance consisting essentially of aluminum plus incidental amounts of conventional impurities.

In accordance with the general processing arrangement, as depicted by the flow sheet comprising FIG. 1 of the drawing, a melt of the bearing alloy of the prescribed composition is prepared, which subsequently is cast into slabs or ingots suitable for rolling into strip stock. Alternatively, the bearing alloy can directly be cast into bearing components of the desired size and configuration which subsequently are machined to accurate final dimensional tolerances. While bearing components comprised entirely of the bearing alloy can be satisfactorily prepared, conventionally the bearing alloy preferably is employed in the form of a composite structure consisting of a high-strength backing material having a relatively thin lining of the bearing alloy on one or more surfaces thereof. Such composite bearing components are conventionally fabricated from a bi-metallic strip of indefinite length comprising a high-strength backing strip to which a relatively thin layer of the bearing alloy has been bonded.

The formation of such a bi-metallic strip suitable for use in fabricating various bearing components therefrom, including shell-type half bearings, thrust washers, flanged bearings such as the flanged bearing 6 shown in FIG. 2, can be accomplished by any one of the variety of processing techniques well known in the art. Of these techniques, a roll bonding of the bearing alloy provided in the form of a relatively thin strip is the most common and preferred commercial practice. In accordance with this practice, the bearing alloy is either continuously cast in the form of a slab usually about ¼-inch up to about one-inch thick which, in accordance with the flow diagram depicted in FIG. 1, is subjected to rolling so as to effect a reduction in the thickness thereof to within a range of about $\frac{1}{16}$ to about $\frac{1}{8}$-inch. Alternatively, the bearing alloy can be cast in the form of suitable elongated ingots which similarly can be converted through multiple rolling operations into strip stock of the desired thickness. The resultant work hardening imparted to the bearing alloy by the roll reduction is conveniently removed by subjecting the strip stock prior to bonding to the backing strip to an annealing treatment. This can conveniently be achieved at temperatures ranging from about 700° F. to about 900° F. for periods of time of from about 30 minutes up to about 12 hours. Satisfactory results have been obtained by subjecting a bearing alloy strip of a nominal thickness of about $\frac{1}{16}$-inch and of a nominal composition of about 4% tin, 4% silicon, 1% copper, and the balance aluminum, to an air annealing treatment at a temperature of about 800° F. for a period of about three hours, resulting in an annealed alloy strip of about "O" temper.

The formation of composite bearing strips thereafter is achieved by superimposing the strip of bearing alloy against the surface of a suitable high-strength metal backing strip, either on a continuous or batchwise basis, and applying a sufficient pressure to the superimposed layers so as to effect a reduction in the thicknesses thereof and a solid phase welding at the interface therebetween. A specific technique which has been found eminently satisfactory for producing a composite bi-metal strip is described in U.S. Pat. No. 3,078,563, granted Feb. 26, 1963, and which is assigned to the same assignee as the present invention. The process as described in the aforementioned patent, which is incorporated herein by reference, in essence employs a rolling mill in which the diameter of the rolls in contact with the aluminum strip and the backing strip are of different diameter such that the unit pressure imposed on the aluminum alloy bearing strip is substantially higher than the unit pressure applied to the backing strip. While various high-strength backing materials can be employed for forming such composite strip materials, low carbon steels, such as SAE 1010, 1020 or 1030, and the like, as well as other high-strength low alloy steels, have been found satisfactory for most uses. Prior to roll bonding, the surface of the aluminum alloy strip and steel backing strip are preliminarily cleaned conventionally including a degreasing operation, as well as a sanding and/or wire brushing process, to remove any residuary oxides, scale or other contaminating substances from the surfaces thereof which might otherwise adversely effect the strength of the resultant bond. The two cleaned strips are subsequently preheated to an elevated temperature in a reducing atmosphere so as to prevent the formation of any oxides on the surfaces to be bonded. Preheat temperatures for this purpose may range from about 700° F. to about 950° F., and preferably from about 875° F. to about 925° F.

The preheated superimposed cleaned strips subsequently pass through the rolling assembly in which a reduction in the thickness of both the backing strip and aluminum alloy bearing strip is effected, while simultaneously effecting a solid phase welding of the two strips into a composite bi-metallic bearing material. For this purpose, pressures to effect at least about a 40% reduction in the gauge of the aluminum alloy bearing strip and preferably from about 50% to about 75% have been found particularly satisfactory for forming a bond of a strength sufficient to withstand relatively severe fabrication operations during the formation of bearing components, as well as the elevated temperatures and stresses to which the bearing components are subjected during use. In order to minimize the degree of reduction in thickness of the hard metal backing strip and minimize a work hardening thereof during the roll bonding step, it is preferred, in accordance with the process described in the aforementioned United States patent, to employ a roll assembly in which the roll in contact with the aluminum alloy bearing strip is of a diameter preferably less than one-half the diameter of the roll in contact with the steel strip, and usually preferably less than about one-fifth the diameter of the roll in contact with the backing strip.

In any event, the aluminum bearing alloy strip and high-strength backing strip become tenaciously bonded upon passage through the roll assembly providing a bond which is of substantially uniform high strength over the entire surface area of the composite strip. This bond is attained without the necessity of employing various electroplating pre-treatments, such as nickel platings, cobalt platings, silver platings, copper platings, etc., which heretofore were found necessary in many instances to attain a bond of the desired strength. It will be understood, however, that while such intervening platings are ordinarily not necessary, in accordance with the practice of the present invention, it is contemplated that one or combinations of such pre-treatments can be employed in those limited instances where this may be desirable.

The resultant composite bearing strip can be subjected to conventional metal stamping, blanking and forming operations of the types well known in the art in order to fabricate the desired bearing components therefrom including the flanged type bearing 6 shown in FIG. 2.

In order to further illustrate the improved aluminum based bearing alloy composition comprising the present invention, the following specific example is provided. It will be understood that this example is provided for illustrative purposes and is not intended as being restrictive of the scope of the invention as defined in the subjoined claims.

EXAMPLE

A melt of a bearing alloy was prepared incorporating about 4% tin, about 4% silicon, about 1% copper, with the balance consisting essentially of aluminum and incidental impurities present in an amount less than about 0.5%. The resultant melt was continuously cast in the form of a slab approximately 10 inches wide and about ¼-inch thick. The slab, after solidification, was subjected to a multiple rolling operation in which its thickness was reduced to about ⅟₁₆-inch. Thereafter, the resultant strip was annealed for a period of about 12 hours at 850° F. in an air atmosphere.

A type 1010 steel strip of a nominal thickness of 0.050 inch was degreased and thereafter subjected to sanding to remove all oxides and scale from the surfaces thereof. The aluminum based bearing alloy strip was degreased and wire brushed. The two precleaned strips were thereafter disposed in superimposed relationship and preheated to a temperature of about 900° F. while in a reducing atmosphere. After attaining the preheat temperature, the superimposed strips were rolled by passing them between a rolling mill in which the roll in contact with the exterior surface of the aluminum based bearing alloy was of a diameter of two inches, while the roll in contact with the exterior surface of the steel backing strip was of a diameter of 12 inches. The rolls were gauged so as to effect about a 65% reduction in the thickness of the aluminum bearing strip and about 2% in the thickness of the steel backing strip.

The resultant composite strip was employed for fabricating flanged steel-type half bearings of the type shown in FIG. 2 which were subjected to tests in internal combustion engines under dynamometer test conditions. These tests revealed that such composite bearings employing the improved bearing alloy comprising the present invention possessed excellent fatigue resistance, good corrosion resistance and good antifrictional qualities, both on the internal diameter and the faces of the flanges, under typical operating conditions of internal combustion engines.

In addition to the foregoing, test specimens prepared from the composite strip were evaluated with respect to the bond attained between the bearing lining and steel backing member. These evaluations clearly confirmed the uniform high-strength bond obtained. Bond shear strengths in excess of about 11,700 p.s.i. were not uncommon.

The uniformity of the microstructure of the bearing alloy prepared in accordance with this example is illustrated by the photomicrograph comprising FIG. 3 of the drawing. This photomicrograph was taken through a bimetallic strip comprising the aluminum bearing alloy lining 8 and the steel backing strip 10, which was preliminarily subjected to a Keller's etching. At a magnification of 200, uniform and fine-sized microstructure of the alloy is apparent, revealing an equiaxed distribution of the tin and silicon constituents throughout an aluminum matrix.

While it will be apparent that the embodiments of the invention herein disclosed are well calculated to fulfill the objects above stated, it will be appreciated that the invention is susceptible to modification, variation and change without departing from the spirit thereof.

What is claimed is:

1. A composite bearing material comprising a high-strength backing strip having a bearing lining on at least one face surface thereof and tenaciously bonded thereto, said bearing lining consisting of about 3.5% to about 4.5% tin, from about 3.5% to about 4.5% silicon, from about 0.7% to about 1.3% copper, and the balance aluminum along with conventional incidental impurities.

2. The composite bearing material as defined in claim 1 in which said bearing lining further consisting of up to about 0.5% maximum iron, up to about 0.2% maximum titanium, up to about 0.2% maximum manganese and up to about 0.2% maximum magnesium, and wherein said incidental impurities are present in an amount less than about 0.15%.

3. The composite bearing material as defined in claim 1, wherein said tin is present in an amount of about 4%, said silicon is present in an amount of about 4% and said copper is present in an amount of about 1%.

4. A bearing component comprising of a high strength backing material having a bearing lining bonded to at least one face thereof, said lining comprised of a bearing alloy consisting of from about 3.5% to about 4.5% tin, from about 3.5% to about 4.5% silicon, from about 0.7% to about 1.3% copper, and the balance aluminum including incidental impurities.

5. The bearing component as described in claim 4, wherein said bearing lining consists of about 4% tin, about 4% silicon, about 1% copper, up to about 0.5% iron, up to about 0.2% maximum titanium, up to about 0.2% maximum manganese and up to about 0.2% maximum magnesium, up to 0.15% incidental impurities, and the balance aluminum.

References Cited

UNITED STATES PATENTS

| 2,473,060 | 6/1949 | Hunsicker et al. | 75—140 |
| 3,300,836 | 1/1967 | Slater et al. | 29—196.2 |

RICHARD O. DEAN, Primary Examiner

U.S. Cl. X.R.
29—196.2; 75—140